United States Patent [19]

Banks

[11] 4,374,578
[45] Feb. 22, 1983

[54] AERIAL CARGO DELIVERY SYSTEM
[75] Inventor: Eddie D. Banks, Renton, Wash.
[73] Assignee: The Boeing Company, Seattle, Wash.
[21] Appl. No.: 170,566
[22] Filed: Jul. 18, 1980
[51] Int. Cl.³ ............................................. B64D 1/12
[52] U.S. Cl. .............................. 244/137 R; 294/83 R;
114/252; 410/77
[58] Field of Search ........... 244/137 R, 151 B, 138 R;
114/252; 294/83 A, 83 R, 84, 11G; 410/77–80,
92, 97, 107, 110, 101

[56]  References Cited
U.S. PATENT DOCUMENTS

| | | | |
|---|---|---|---|
| 1,115,807 | 11/1914 | Gellrich | 114/252 |
| 2,414,725 | 1/1947 | Dunn | 294/83 R |
| 2,789,468 | 4/1957 | Burns | 294/83 R |
| 3,015,513 | 1/1962 | Ewing | 294/83 A |
| 3,028,188 | 4/1962 | Campbell | 294/83 A |
| 3,398,917 | 8/1968 | Grabe | 244/137 R |
| 3,610,674 | 10/1971 | Janssen | 294/101 |

FOREIGN PATENT DOCUMENTS 1166096  3/1964  Fed. Rep. of Germany ... 244/137 R

Primary Examiner—Galen L. Barefoot
Attorney, Agent, or Firm—Ronald E. Suter; Bernard A. Donahue

[57]  ABSTRACT

An aerial cargo delivery system for aircraft having a rear cargo receiving and delivery opening. Cargo bundles, guided between parallel guide rails on the aircraft floor, are restrained by fore and aft restraint straps during normal flight conditions. The aft restraint straps are provided with electrically-actuated release latches which effectively sever the aft straps to permit cargo bundles to pass out of the rear opening when the aircraft is in a nose-up attitude.

2 Claims, 6 Drawing Figures

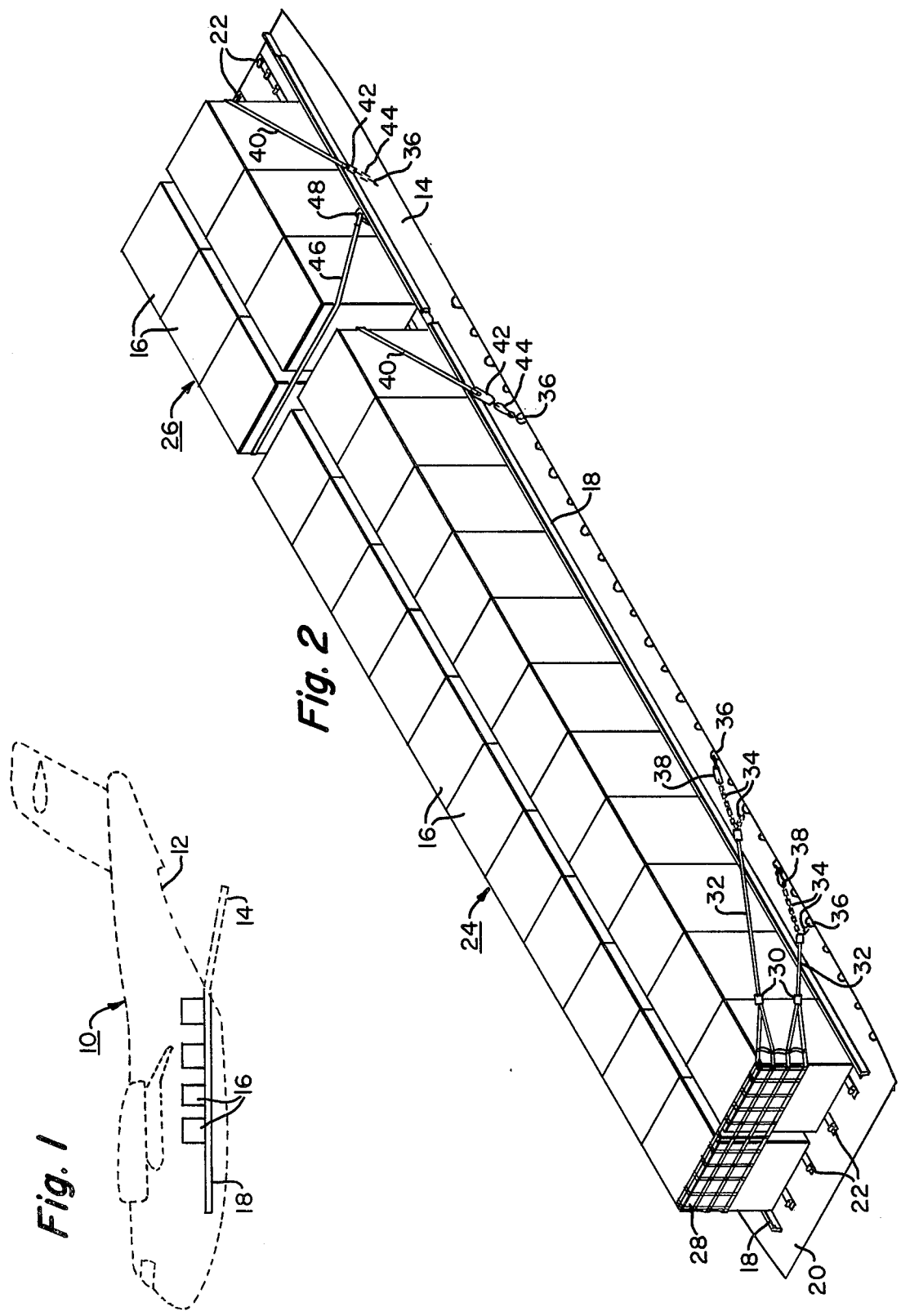

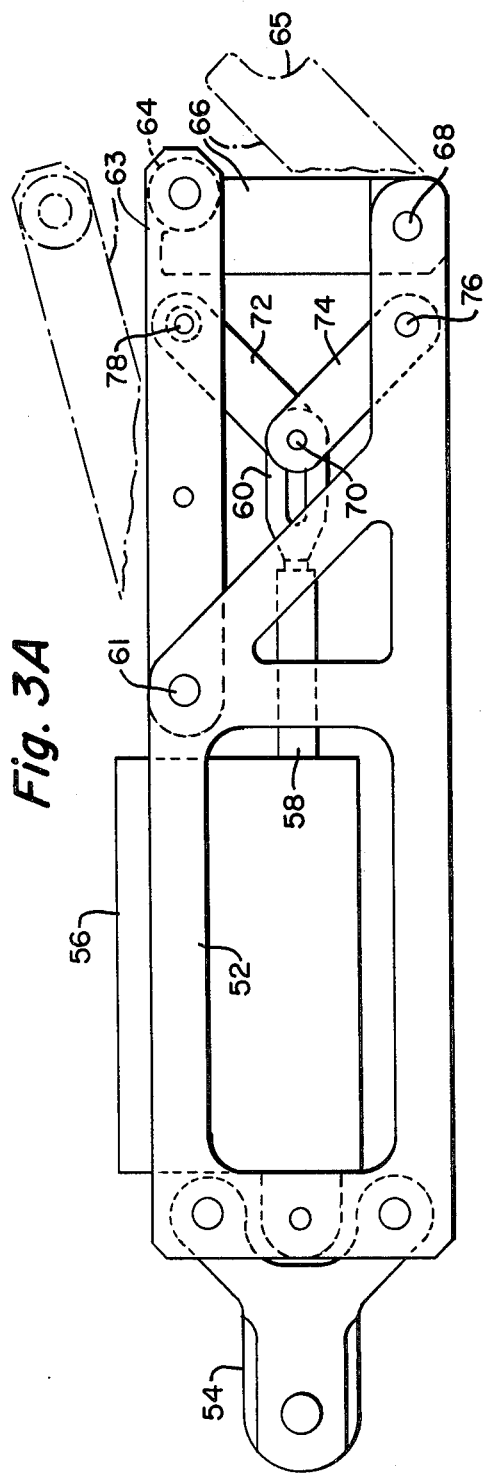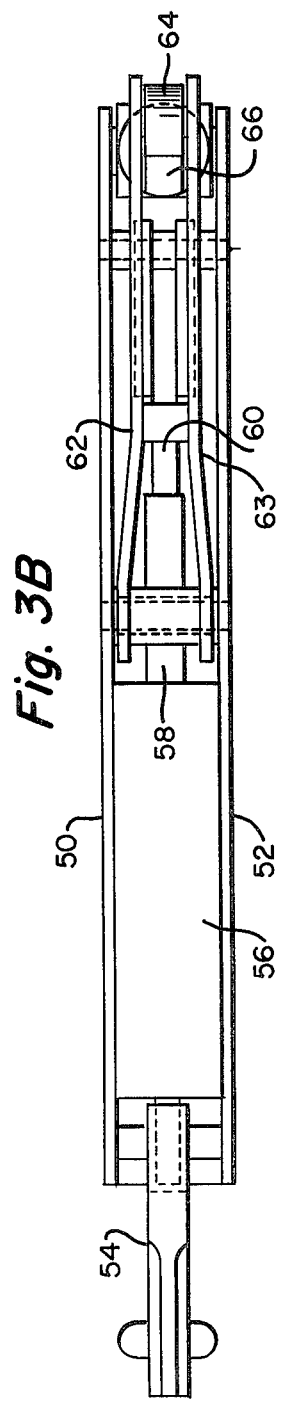

AERIAL CARGO DELIVERY SYSTEM

BACKGROUND OF THE INVENTION

As is known, cargo drops by parachute from aircraft have been used extensively in military operations and disaster relief situations. In one type of parachute cargo delivery system, cargo bundles, which may be on pallets, are guided for movement along the longitudinal axis of the aircraft between parallel guide rails secured to the aircraft floor. Upon a nose-up attitude of the aircraft, the cargo pallets move aft and out of a cargo receiving and delivery opening and then descend to the ground under the restraint of a parachute.

In certain types of aerial delivery systems of this sort, the cargo bundles are restrained by fore and aft restraint straps during normal flight conditions. The aft restraint straps, however, must be severed during an airdrop operation to permit the bundles to move backwardly through the rear cargo receiving and delivery opening by gravitational pull when the aircraft adopts a nose-up attitude.

In the past, the aft straps have been severed during an airdrop operation by means of a retrieval winch line and guillotine knife which severs the aft strap or straps holding the cargo bundles on the aircraft. The winch cable is usually strung the length of the cargo compartment in a more or less makeshift fashion to reach the restraint straps at the aft end of the cargo floor. Slackness in the strap due to bundle shifting and/or a dull knife can cause the system to become unreliable at times, resulting in delays during the airdrop operation which cause the bundles to overshoot the drop zone.

SUMMARY OF THE INVENTION

In accordance with the present invention, the foregoing difficulties encountered with prior art aerial cargo delivery systems of the type described are obviated with the use of electrically-actuated release latches on the aft restraint straps. These can be actuated by an electrical signal to effectively sever the aft restraint straps without encountering delays or malfunctions.

Specifically, there is provided strap means extending across the rearward face of cargo bundles and secured to the aircraft floor forwardly of the rearward face of the bundles, the strap means being formed in at least two parts interconnected by a gate release assembly. The gate release assembly is secured to one of the parts and has a releasable latch which passes through a loop in the end of the other of the parts. Electrical actuator means is provided for disengaging the latch to disconnect the parts and permit cargo bundles to pass through the rear cargo receiving and delivery opening in the aircraft fuselage.

The above and other objects and features of the invention will become apparent from the following detailed description taken in connection with the accompanying drawings which form a part of this specification, and in which:

FIG. 1 is a schematic illustration of a type of aircraft with which the present invention may be used;

FIG. 2 is a perspective view of cargo loaded onto the floor of the aircraft of FIG. 1, showing the manner in which it is restrained by cargo restraint straps;

FIGS. 3A and 3B are side and top views, respectively, of one type of gate release device which can be used in accordance with the invention.

Figure 4A:
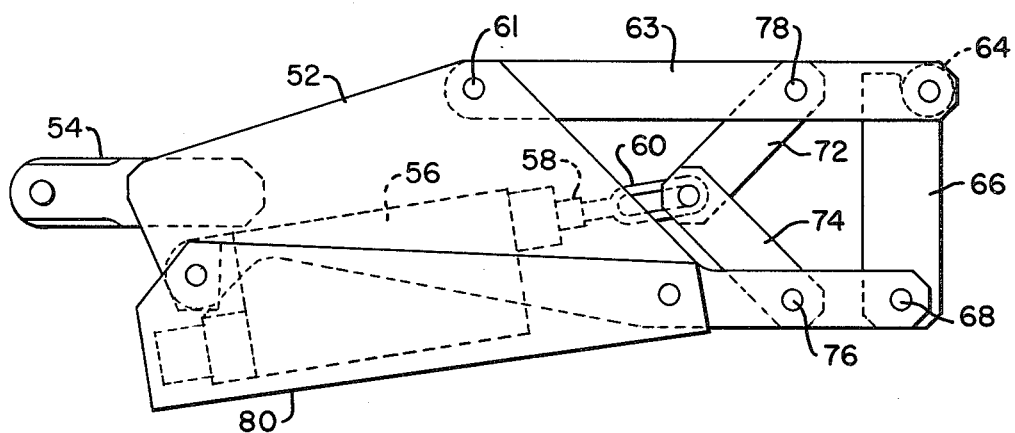
FIGS. 4A and 4B are side and top views, respectively, of another embodiment of a gate release device which can be used in accordance with the invention.

With reference now to the drawings, and particularly to FIG. 1, a cargo plane is shown schematically and identified generally by the reference numeral 10. It is provided on its underside with a rear cargo receiving and delivery opening 12 and ramp 14. Cargo within the aircraft 10 is identified by the reference numeral 16 and is adapted to travel backwardly between restraining guideways or tracks generally indicated by the reference numeral 18. Cargo can be discharged from the aircraft by gravitational pull when the aircraft assumes a nose-up attitude. Before an airdrop operation, however, the cargo on each pellet should be restrained and prevented from movement.

In FIG. 2, the aircraft floor is identified by the reference numeral 20. The rails 18 project upwardly from the floor 20 as shown. Rollers 22 are mounted in the floor 20 and support the cargo bundles 16 which may, for example, comprise containers. Each container can be connected to a parachute or, alternatively, groups of containers can be connected to a single parachute. As shown, the bundles 16 are divided into a forward group 24 and a rear group 26 mounted on the ramp 14. The cargo bundle group 24 is restrained against forward movement by a strap assembly including a forward barrier net 28 connected through connecting links 30 and straps 32 to chains 34 connected to suitable rings 36 secured to and projecting upwardly from the floor 20. Chain tensioners 38 are provided for at least some of the chains 34.

The bundle group 24 is restrained during normal flight conditions by an aft restraint strap 40 which is connected at one end to a ring 36 on the starboard side of the aircraft opposite to the side seen in FIG. 2. Strap 40 is also connected to a gate release device 42, about to be described, the other end of the gate release device being connected through chain tensioner 44 to a ring 36. The rear restraining strap 40 for bundle group 26 is the same as that just described and includes a gate release device 42 and a chain tensioning device 44 connected to a ring 36. The forward restraint strap 46 for the bundle group 26, however, is not connected to a ring 36 but rather is connected at its opposite ends to tensioning devices 48 carried on the two rails or guideways 18.

One embodiment of the gate release device 42 is shown in FIGS. 3A and 3B. It comprises a pair of spaced plates 50 and 52 between which is secured a connecting link 54. The link 54 can be connected to the chain tensioner 44 shown in FIG. 2, for example. Carried between the plates 50 and 52 is an electrical linear actuator 56, the actuator being provided with a push-pull rod 58 secured at its outer end to a slotted link 60. The rod is connected through a screw drive to an electrical motor within the actuator 56 and is adapted to assume any one of three positions—a locked position, an intermediate load position, and a hold-open position. Pivotally carried between the plates 50 and 52 on pin 61 are link arms 62 and 63. These link arms carry, at their outer ends, a roller 64 which engages a recess 65 in the upper end of a latch or linkage 66 pivotally carried between the plates 50 and 52 on pin 68. Passing through the slotted link 60 is a pin 70 which carries, for pivotal movement, two link arms 72 and 74. Link arm 74 is pivotally connected between the plates 50 and 52 on pin 76; while link arm 72 is pivotally connected between the link arms 62 and 63 by means of pin 78.

In the position shown in FIG. 3A, for example, the gate release device is in its locked position with the right end of the slot in link 60 engaging the pin 70 to hold link arms 62 and 63 and roller 64 in engagement with latch 66. When it is desired to release the latch, the linear actuator is activated to cause the rod 58 and link 60 to move to the right. The weight of the pallets, with the aircraft in a nose-up attitude, will then exert a pull on the latch 66, causing it to rotate in a clockwise direction as viewed in FIG. 3A. When the latch starts to release the tension on the strap, the mechanical advantage of the roller 64 going over the end of the latch would allow it to overload the actuator and links except for the slot in link 66 which permits at least limited outward movement of the link arms 62 and 63 as soon as the rod 58 moves to the right. In the intermediate position of the link 60, the left end of the slot therein will engage the pin 70. This is the load position where link arms 62 and 63 will have full travel with the pin 70 sliding to the right in the slot in pin 60 as the link arms rotate upwardly. In this position, latch 66 can be passed through the strap, rotated in a counterclockwise direction as viewed in FIG. 3A, and the link arms 62 and 63 then rotated downwardly until roller 64 engages the upper end of the latch 66. At this point, the rod 58 and linkage 60 can be retracted to the left into the positions shown in FIG. 3A where the device is again locked. In the third position of the rod 58 and link 60, both are moved to their extreme rightward positions where the left end of the slot in link 60 engages pin 70 and holds link arms 62 and 63 in their extended broken-line positions shown in FIG. 3A.

Figure 4B:
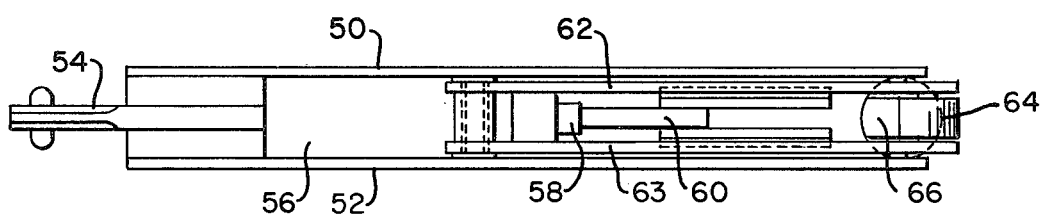

In FIGS. 4A and 4B, the embodiment of the invention is similar to that of FIGS. 3A and 3B. Accordingly, elements in FIGS. 4A and 4B which correspond to those of FIGS. 3A and 3B are identified by like reference numerals. In this case, however, the linear actuator 56 is positioned at an angle with respect to the link arms 62 and 63 in order to afford a more positive opening action when the actuator is activated. Element 80 in FIG. 4 comprises a generally U-shaped guide member which encloses the actuator 56 in its inclined position.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In an aerial cargo delivery system of the type including strap means for securing cargo bundles to the floor of an aircraft, the improvement comprising a gate release assembly for selectively releasing said strap means to permit said bundles to pass through a rear cargo opening in the aircraft, said gate release assembly comprising a pair of spaced apart plates carrying therebetween a first pair of link arms pivotally connected to said plates at one of their ends and carrying a roller therebetween at their other ends, an actuator carried between said plates, a latch pivotally connected at one end between said plates to move between cargo restraining and cargo releasing positions and carrying a recess at the other end, said recess engaging said roller when said latch is in said cargo restraining position; a second pair of link arms pivotally connected at one end thereof to each other and to said actuator, one arm of said second pair being pivotally connected to said first pair of link arms at its other end and the other arm of said second pair being pivotally connected to said plates at its other end, whereby said actuator will, upon actuation, cause said second pair of link arms to move said first pair of link arms about their pivot which will in turn move said roller out of said recess and permit said latch to move said cargo releasing position.

2. The improvement of claim 1, further comprising an actuator rod connected to said actuator on one end and carrying a slotted link on the other, the pivotal connection of said second pair of link arms to each other being carried by said slotted link.

* * * * *